United States Patent
Zawisa et al.

(10) Patent No.: US 8,206,862 B2
(45) Date of Patent: Jun. 26, 2012

(54) METHOD TO MEASURE AND COMMUNICATE CELL VOLTAGE IN A FUEL CELL STACK BY EMBEDDING MEASUREMENT UNITS ON THE PLATE

(75) Inventors: Michael F. Zawisa, Victor, NY (US); David D. Rea, Pittsford, NY (US); Kenneth L. Kaye, Fairport, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 317 days.

(21) Appl. No.: 12/719,156

(22) Filed: Mar. 8, 2010

(65) Prior Publication Data

US 2011/0217612 A1    Sep. 8, 2011

(51) Int. Cl.
*H01M 8/04* (2006.01)
(52) U.S. Cl. ........ 429/432; 429/428; 429/430; 429/433; 429/442
(58) Field of Classification Search .................. None
See application file for complete search history.

(56) References Cited

U.S. PATENT DOCUMENTS

2007/0231641 A1 * 10/2007 Skala et al. .................. 429/23

* cited by examiner

*Primary Examiner* — Cynthia Lee
(74) *Attorney, Agent, or Firm* — John A. Miller; Miller IP Group, PLC

(57) ABSTRACT

A system for communicating measurement data from each fuel cell or a group of fuel cells in a fuel cell stack, including a plurality of fuel cells, a plurality of stack plates, and a plurality of embedded smart plates. The stack plates are between each fuel cell and on each end of the stack, and the plurality of embedded smart plates are mechanically and electrically coupled to at least one of the plurality of stack plates, and each smart plate including optical transceivers on the top side and the bottom side. The system further includes first and second aggregator devices, said first and second aggregator devices including at least one optical transceiver for communicating with the embedded smart plate adjacent to the first or second aggregator device, where one aggregator device initiates communication with the embedded smart plates and the other aggregator device completes communication.

20 Claims, 3 Drawing Sheets

METHOD TO MEASURE AND COMMUNICATE CELL VOLTAGE IN A FUEL CELL STACK BY EMBEDDING MEASUREMENT UNITS ON THE PLATE

BACKGROUND OF THE INVENTION

1. Field of the Invention

This invention relates generally to a fuel cell stack monitoring system and, more particularly, to a monitoring system for a fuel cell stack that employs an aggregator device at each end of the stack for collecting optical signals and by-passing malfunctioning optical signal devices to determine measured parameters of the fuel cells or group of fuel cells in the stack.

2. Discussion of the Related Art

Hydrogen is a very attractive fuel because it is clean and can be used to efficiently produce electricity in a fuel cell. A hydrogen fuel cell is an electro-chemical device that includes an anode and a cathode with an electrolyte therebetween. The anode receives hydrogen gas and the cathode receives oxygen or air. The hydrogen gas is dissociated in the anode side catalyst to generate free protons and electrons. The protons pass through the electrolyte to the cathode. The protons react with the oxygen and the electrons in the cathode side catalyst to generate water. The electrons from the anode cannot pass through the electrolyte, and thus are directed through a load to perform work before being sent to the cathode.

Proton exchange membrane fuel cells (PEMFC) are a popular fuel cell for vehicles. The PEMFC generally includes a solid polymer electrolyte proton conducting membrane, such as a perfluorosulfonic acid membrane. The anode and cathode electrodes (catalyst layers) typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA). Each MEA is usually sandwiched between two sheets of porous material, a gas diffusion layer (GDL), that protects the mechanical integrity of the membrane and helps in uniform reactant and humidity distribution. The part of the MEA that separates the anode and cathode flows is called the active area, and only in this area the water vapors can be freely exchanged between the anode and cathode. MEAs are relatively expensive to manufacture and require certain humidification conditions for effective operation.

Several fuel cells are typically combined in a fuel cell stack to generate the desired power. For example, a typical fuel cell stack for a vehicle may have two hundred or more stacked fuel cells. The fuel cell stack receives a cathode input reactant gas, typically a flow of air forced through the stack by a compressor. Not all of the oxygen is consumed by the stack and some of the air is output as a cathode exhaust gas that may include water as a reaction by-product. The fuel cell stack also receives an anode hydrogen reactant gas that flows into the anode side of the stack. The stack also includes flow channels through which a cooling fluid flows.

A fuel cell stack includes a series of bipolar plates (separators) positioned between the several MEAs in the stack, where the bipolar plates and the MEAs are positioned between the two end plates. The bipolar plates include anode side and cathode side flow distributors (flow fields) for adjacent fuel cells in the stack. Anode gas flow channels are provided on the anode side of the bipolar plates that allow the anode reactant gas to flow to the respective MEA. Cathode gas flow channels are provided on the cathode side of the bipolar plates that allow the cathode reactant gas to flow to the respective MEA. One end plate includes anode gas flow channels, and the other end plate includes cathode gas flow channels. The bipolar plates and end plates are made of a conductive material, such as stainless steel or a conductive composite. After stacking, these components are typically placed under compression to minimize electrical contact resistances and to close the seals. The end plates conduct the electricity generated by the fuel cells out of the stack. The bipolar plates also include flow channels through which a cooling fluid flows.

High frequency resistance (HFR) is a well-known property of fuel cells, and is closely related to the ohmic resistance, or membrane protonic resistance, of fuel cell membranes. Ohmic resistance is itself a function of the degree of fuel cell membrane humidification. Therefore, by measuring the HFR of the fuel cell membranes of a fuel cell stack within a specific band of excitation current frequencies, the degree of humidification of the fuel cell membrane may be determined. This HFR measurement allows for an independent measurement of the fuel cell membrane humidification, thereby eliminating the need for RH sensors.

Typically, the voltage output and possibly the high frequency resistance (HFR) of every fuel cell in the fuel cell stack is monitored so that the system knows if a fuel cell voltage or a fuel cell HFR is outside of a desired range, indicating a possible failure. As is understood in the art, because all of the fuel cells are electrically coupled in series, if one fuel cell in the stack fails, then the entire stack will fail. Certain remedial actions can be taken for a failing fuel cell, as a temporary solution, until the fuel cell vehicle can be serviced. Such remedial actions include increasing the flow of hydrogen and/or increasing the cathode stoichiometry.

The fuel cell voltages and the HFR of the fuel cells are typically measured by monitoring sub-systems that include a wire connected to each bipolar plate in the stack and end plates of the stack. Therefore, a 400 cell stack will include 401 wires connected to the stack. Because of the size of the parts, the tolerances of the parts, the number of the parts, etc., it may be impractical to provide a physical connection to every bipolar plate in a stack with this many fuel cells. Therefore, there is a need in the art for a system and method for measuring cell voltage and HFR without requiring wires connected to each bipolar plate.

SUMMARY OF THE INVENTION

In accordance with the teachings of the present invention, a system for communicating measurement data from each fuel cell or a group of fuel cells in a fuel cell stack is disclosed. The system includes a plurality of fuel cells and a plurality of stack plates, with a stack plate between each fuel cell and on each end of the stack. The system also includes a plurality of embedded smart plates, each embedded smart plate being mechanically and electrically coupled to at least one of the plurality of stack plates in the fuel cell stack, and each embedded smart plate including optical transceivers on the top side and the bottom side of the embedded smart plates. The system further includes first and second aggregator devices, said first and second aggregator devices including at least one optical transceiver for communicating with the embedded smart plate adjacent to the first or second aggregator device, where one aggregator device initiates communication with the embedded smart plates and the other aggregator device completes communication.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a system and method for utilizing an aggregator device at each end of the stack to determine measured parameters of the fuel cells or a group of fuel cells in a fuel cell stack utilizing an optical signal is merely exemplary in nature, and is in no way intended to limit the invention or its applications or uses.

Figure 1:
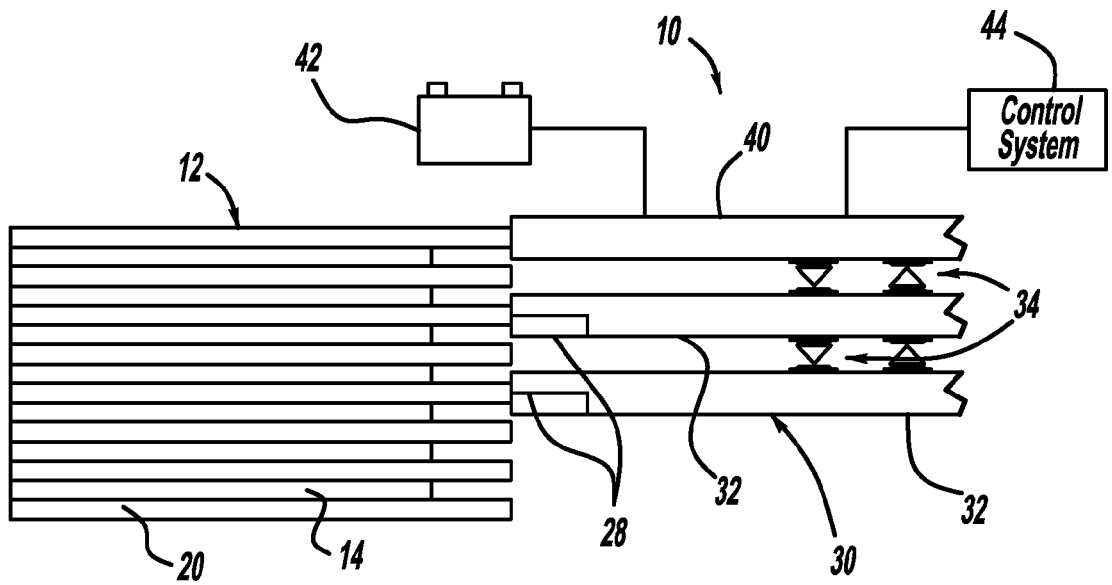
FIG. 1 is a plan view of a fuel cell system including a fuel cell stack having a plurality of fuel cells and embedded smart plates.

FIG. 1 is a plan view of a system 10 including a fuel cell stack 12 having a plurality of fuel cells 14. Although not shown for the sake of clarity, each fuel cell 14 includes a fuel cell membrane, an anode side diffusion media layer, and a cathode side diffusion media layer, as would be readily apparent to those skilled in the art. Stack plates 20 are also part of the system 10, such as a bipolar plate between each fuel cell 14 and a unipolar plate on each end of the stack 12, where the side of the stack plate 20 facing the anode side diffusion media layer includes anode side reactant gas flow channels (not shown) and the side of the stack plate 20 facing an adjacent fuel cell 14 includes cathode reactant gas flow channels (not shown). Additionally, the stack plates 20 include cooling fluid flow channels (not shown).

In a fuel cell stack that is measured in series by virtue of the topology and geometry of the fuel cells in the stack, it is desirable to measure certain parameters for the purpose of controlling the operation of the stack. Such parameters may include the voltage potential across individual cells or groups of cells, the temperature at certain points within the stack, or any other quantifiable parameter which may be represented by an electrical signal or numeric value, such as high frequency resistance (HFR).

According to the present invention, a measurement value such as the voltage or HFR of each fuel cell 14, or group of fuel cells 14, is measured by an embedded smart plate (ESP) 30. Each ESP 30 includes an ESP printed circuit board 32, described in detail below, and at least one connector 28 for connecting the ESP printed circuit board 32 to one of the stack plates 20. Thus, the ESPs 30 are arranged in the stack analogous to, and possibly embedded within, the stack 12 in a columnar arrangement such that each ESP printed circuit board 32 in the stack 12 is located immediately above or below each printed circuit board 32 adjacent to it.

When the ESPs 30 are embedded, and/or powered by the cells 14 of the stack 12, communicating with the ESPs 30 while maintaining electrical isolation between the ESPs 30 and a control device, such as an aggregator device 40 (discussed below), is necessary because operation of the fuel cell stack 12 may create a large common mode voltage potential between the stack 12 and the aggregator device 40. To maintain the necessary electrical isolation, the present invention utilizes the aggregator device 40. The ESP 30 adjacent to the aggregator device 40 is the starting point for communication. The aggregator device 40 is placed at some location within the fuel cell stack 12, typically at one end, to request and coordinate the location and measured values of each fuel cell 14, or a group of fuel cells 14, in the stack 12.

Each ESP 30 is mechanically and electrically connected to at least one of the stack plates 20, thereby allowing the ESP printed circuit board 32 to receive parasitic operating power from, and measure various measured values, such as the voltage of the fuel cell 14, or group of fuel cells 14, corresponding to the stack plate 20 that the printed circuit board 32 is connected to. The system 10 illustrates an ESP 30 connected to every other stack plate 20 in the fuel cell stack 12, thereby requiring each ESP 30 to measure the voltage, for example, of two fuel cells 14 in the stack 12. In an alternate embodiment, each ESP 30 may be electrically coupled to five consecutive stack plates 20 using various interconnection devices, thereby allowing the measured value of four fuel cells 14 to be determined by a single ESP 30. Each of the ESP printed circuit boards 32 also includes optical transceivers 34 mounted on the geometric top surface and the bottom surface of the circuit board 32. The optical transceivers 34 are utilized for sending and receiving information via modulated signals that may be conveyed between the ESPs 30, as is described in detail below.

The aggregator device 40, which is a variation of the ESP printed circuit board 32, receives its operating power from a battery 42 instead of from a fuel cell 14, thereby maintaining galvanic isolation between the ESPs 30 and the aggregator device 40 without requiring the use of costly electrical isolation components. The aggregator device 40 initiates communication with the first ESP 30 in the fuel cell stack 12 using the optical transceivers 34 located on the aggregator device 40 to establish the location of the first ESP 30 in the stack 12, and collect, for example, the minimum measured voltage of the fuel cell 14, or group of fuel cells 14, associated with the stack plate(s) 20 to which the first ESP 30 is connected. Each ESP 30 in the stack 12 is communicated with to determine the location and the minimum cell voltage of each fuel cell 14 in the stack 12 in a daisy-chain fashion, i.e., in series, using, for example, a 9/N/1 protocol, until the location and the minimum cell voltage of all the fuel cells 12 in the stack 10 are known. Other measurements of the fuel cells 14 may be performed as well, for example, measured HFR of each fuel cell 14. In this way, the ESP 30, in conjunction with the aggregator device 40, communicates the location and measurement information of each fuel cell 14 in the stack 12 to the aggregator device 40, which may then communicate the location and measurement information to a control system 44.

Figure 2:
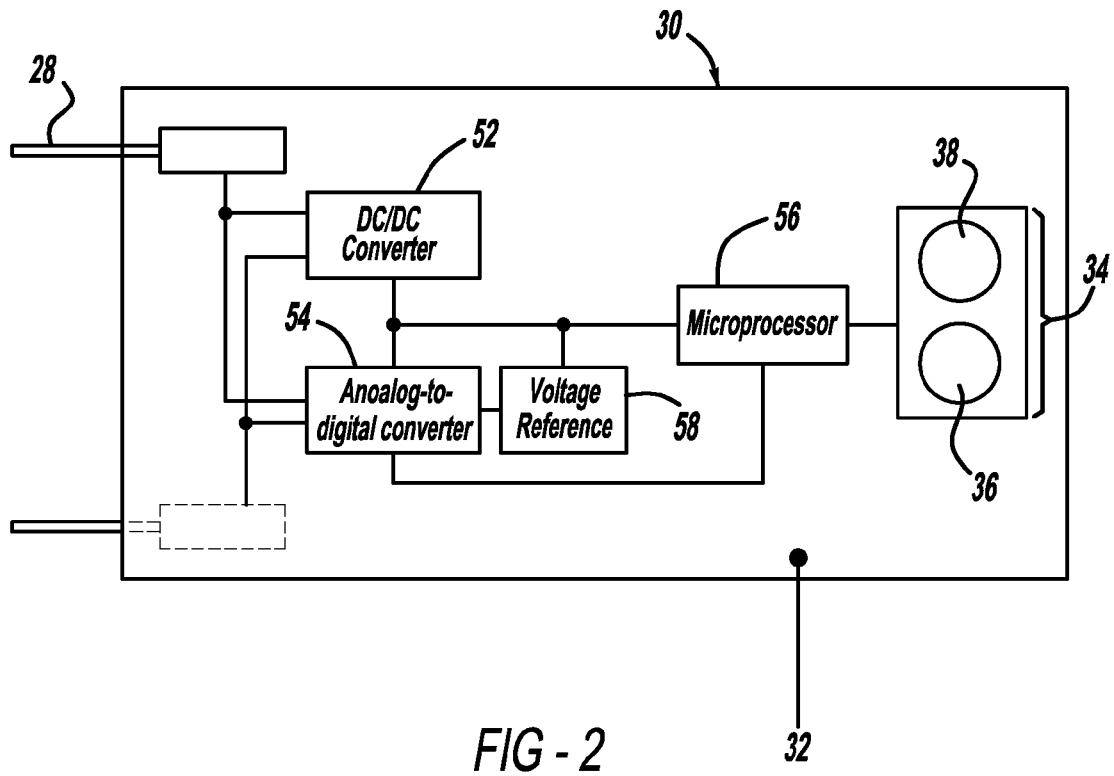
FIG. 2 is a simplified block diagram of one of the embedded smart plates shown in FIG. 1.

FIG. 2 is a simplified block diagram of the ESP 30, including a plurality of electronic components that are bonded to form the ESP printed circuit board 32. Each circuit board 32 includes a low-input-voltage DC-to-DC converter 52 that converts a small amount of power from the fuel cell 14, or group of fuel cells 14, into a stable and usable operating voltage for the ESP printed circuit board 32. The circuit board 32 also includes an analog-to-digital converter 54 that converts the differential voltage value of the fuel cell 14, or group of fuel cells 14, (hereinafter, the "measured value") into a numerical value which may be processed and communicated by a microprocessor 56 that is electrically coupled to the optical transceivers 34, thereby enabling communication to adjacent ESPs 30 and/or the aggregator device 40. The microprocessor 56 may also determine which of the cells has the minimum cell voltage or the maximum cell voltage, and other ancillary data (such as its own operational status), which may also be communicated via the optical transceivers 34. Further, the ESP printed circuit board 32 includes a voltage reference 58 that generates a stable voltage such that the stable voltage generated may be compared to the measured value by the analog-to-digital converter 54. In a non-limiting embodiment of the present invention, the voltage reference 58 and the analog-to-digital converter 54 may be integrated into the microprocessor 56.

As shown in FIG. 2, each of the ESP printed circuit boards 32 has two of the connectors 28 for connecting the circuit board 32 to the stack plate 20. However, those skilled in the art will recognize that a variety of designs for connecting the circuit board 32 to the stack plate 20 may be used without departing from the scope of the present invention.

As mentioned above, each ESP printed circuit board 32 also includes optical transceivers 34 on the top and the bottom of the circuit board 32 to enable data communication to and from adjacent ESPs 30 and the aggregator device 40. The aggregator device 40 also includes optical transceivers 34 for communicating with the ESPs 30. Each of the optical transceivers 34 includes an optical transmitter 36, such as light emitting diodes (LEDs), and an optical receiver 38, such as semiconductor light detectors, photo-transistors, or photodiodes, for sending and receiving information. The optical transceivers 34 of each ESP printed circuit board 32 and each aggregator device 40 are aligned for optical signal communication. More specifically, the optical transmitter 36 of a first ESP printed circuit board 32 is aligned with the optical receiver 38 of a second ESP printed circuit board 32, and vice versa, such that the first and second ESP printed circuit boards 32 are able to send optical information back and forth, as shown in FIG. 1.

The optical transmitters 36 and the optical receivers 38 are selected such that their respective spectral emissivity and sensitivity are matched and located such that the optical transmitter 36 on the top side of a central ESP 30 shines directly onto the photosensitive area of the optical receiver 38 of the next higher ESP 30 in the stack immediately above the central ESP 30. Inversely, the orientation of the bottom optical transmitter 36 on the central ESP 30 shines directly on the optical receiver 38 on the top side of the next lower ESP 30 in the stack immediately below the central ESP 30. Data exchanged across LED/detectors of the optical transceivers 34 by the respective microprocessors of the sending and receiving ESPs 30, as described above, are organized into packets of data bits, wherein each data bit is represented by a pulse of light, and the separation of pulses determines the value of the data bit. This communication method can be pulse position modulation (PPM), as is readily apparent to those skilled in the art. All of the transceivers 34 of the ESP printed circuit boards 32 are aligned to allow for communication, as the ESPs 30 in the stack 12 are aligned in a columnar arrangement as discussed above.

Many techniques exist in the art where the optical signal from the optical transceivers 34 can provide an indication of measured values such as voltage potential, HFR or other ancillary data (e.g., the operational status of the circuit board 32). For example, in an analog version, the intensity of the light from the optical transmitter 36 can be an indication of the voltage potential, where the optical signal is proportional to the voltage. As discussed above, the circuit board 32 may include a voltage regulator, such as the DC/DC converter 52, to convert the voltage to a level usable by the optical transceivers 34. Also, the ESP printed circuit board 32 may include the analog-to-digital converter 54, discussed above, to generate a digital optical signal that is frequency modulated to encode the measured values.

Most optical transceivers, such as LEDs, have a minimum forward voltage of about 1.2 volts, rendering them impractical for measuring a single cell voltage. Thus, the ESP printed circuit board 32 may also include a miniature booster converter to amplify the measured voltage. The feedback loop of the booster converter could be designed to have its output current follow the input voltage, allowing the intensity of the optical transceivers 34 to vary with the measured values.

Figure 3:
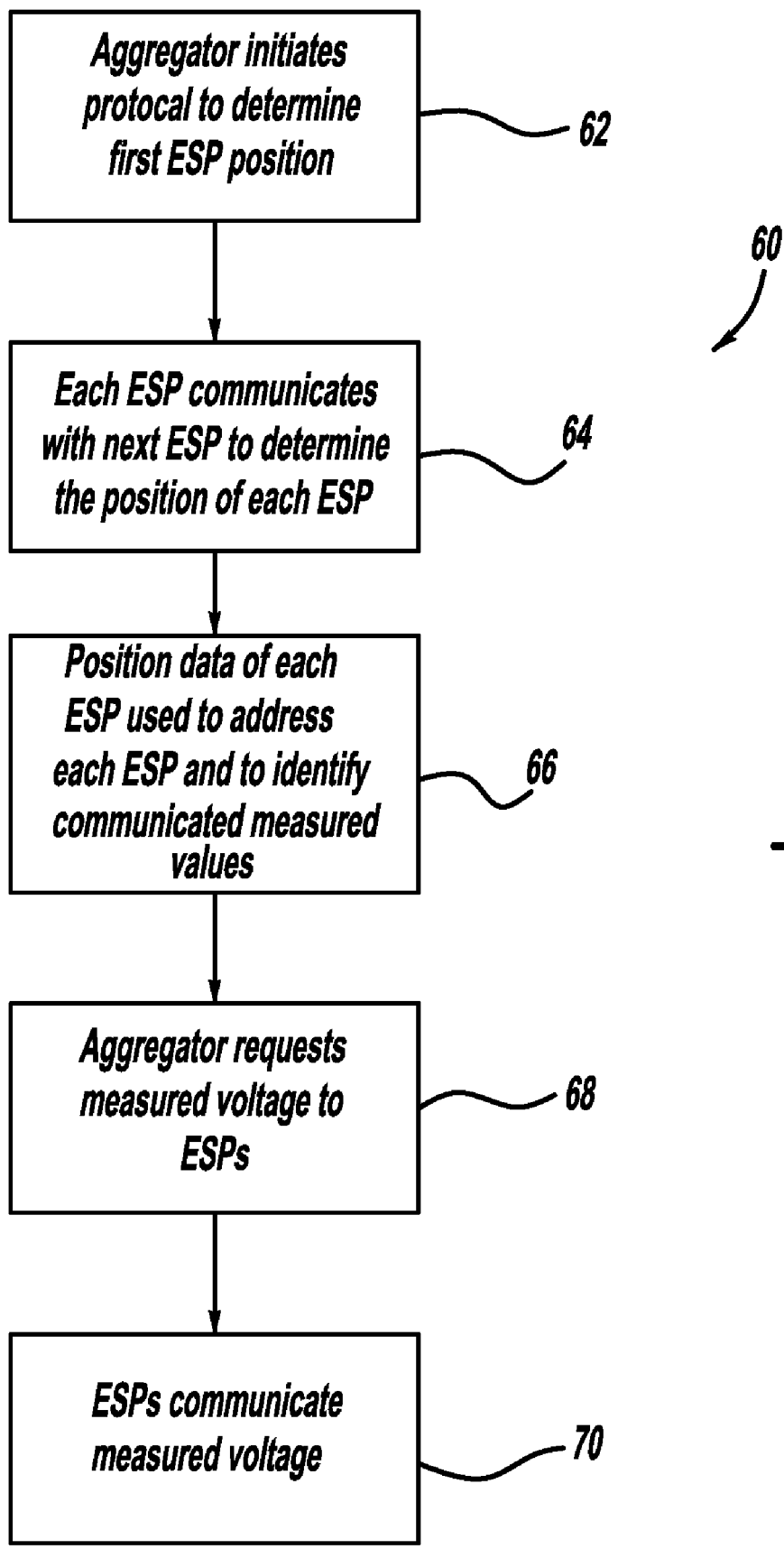
FIG. 3 is a flow diagram of how an aggregator device initiates communication and determines the location and data collected by each of the smart plates shown in FIG. 1.

FIG. 3 is a flow diagram 60 illustrating how the system 10 may measure and communicate the cell voltage of each of the fuel cells 14, or group of the fuel cells 14 in the stack 12. Upon activation, the aggregator device 40 initiates a protocol to the first ESP 30 in the stack 12 at box 62. The aggregator device 40 determines the z-axis sequential position of the first ESP 30 by communicating via the optical transceivers 34 on the aggregator device 40 and the ESP printed circuit board 32 of the first ESP 30, which are aligned such that the signals from the optical transmitter 36 of the aggregator device 40 are directly communicated to the optical receiver 38 of the optical transceiver 34 of the first ESP 30. Each ESP 30 then communicates with the next ESP 30 in the columnar arrangement in a daisy-chain fashion, i.e., by communicating through each of the ESPs 30 in series by utilizing the optical transceivers 34 that are located on the top and bottom of each of the ESP printed circuit boards 32 of the ESPs 30 in the stack 12 at box 64. The optical transceivers 34 of each of the ESPs 30 are aligned in a columnar arrangement to send and receive information to each adjacent ESP 30 using the optical transceivers 34 as described above. Thus, the z-axis sequential position of each ESP 30 in the fuel cell stack 12 may be determined. Subsequently, the z-axis sequential position of each ESP 30 in the stack 12 is used to address each ESP 30 and to identify the measured value of each ESP 30 that is communicated from each of the ESPs 30 using the optical transceivers 34 at box 66.

For example, during normal operation, each ESP 30 may continuously measure the voltage generated by the fuel cell 14, and more specifically the voltage generated by the fuel cell membrane that is present across the stack plates 20. When the aggregator device 40 sends a request for measured voltage to the ESPs 30 at box 68 via the optical transceivers 34, the ESPs 30 communicate the measured voltage using digital signaling via the optical transceivers 34 at box 70. In this way, the ESPs 30 and their optical transceivers 34 form a bussed data transmission system.

In an alternate embodiment of the present invention, the ESPs 30 may employ a true multipoint optical bus to improve reliability, such as by employing a construction using light-pipe technology. Thus, the failure of a single ESP 30 would not interrupt the transmission of measured values and other data to and from the ESPs 30 located at z-axis sequential positions distal to the control system 44.

Figure 4:
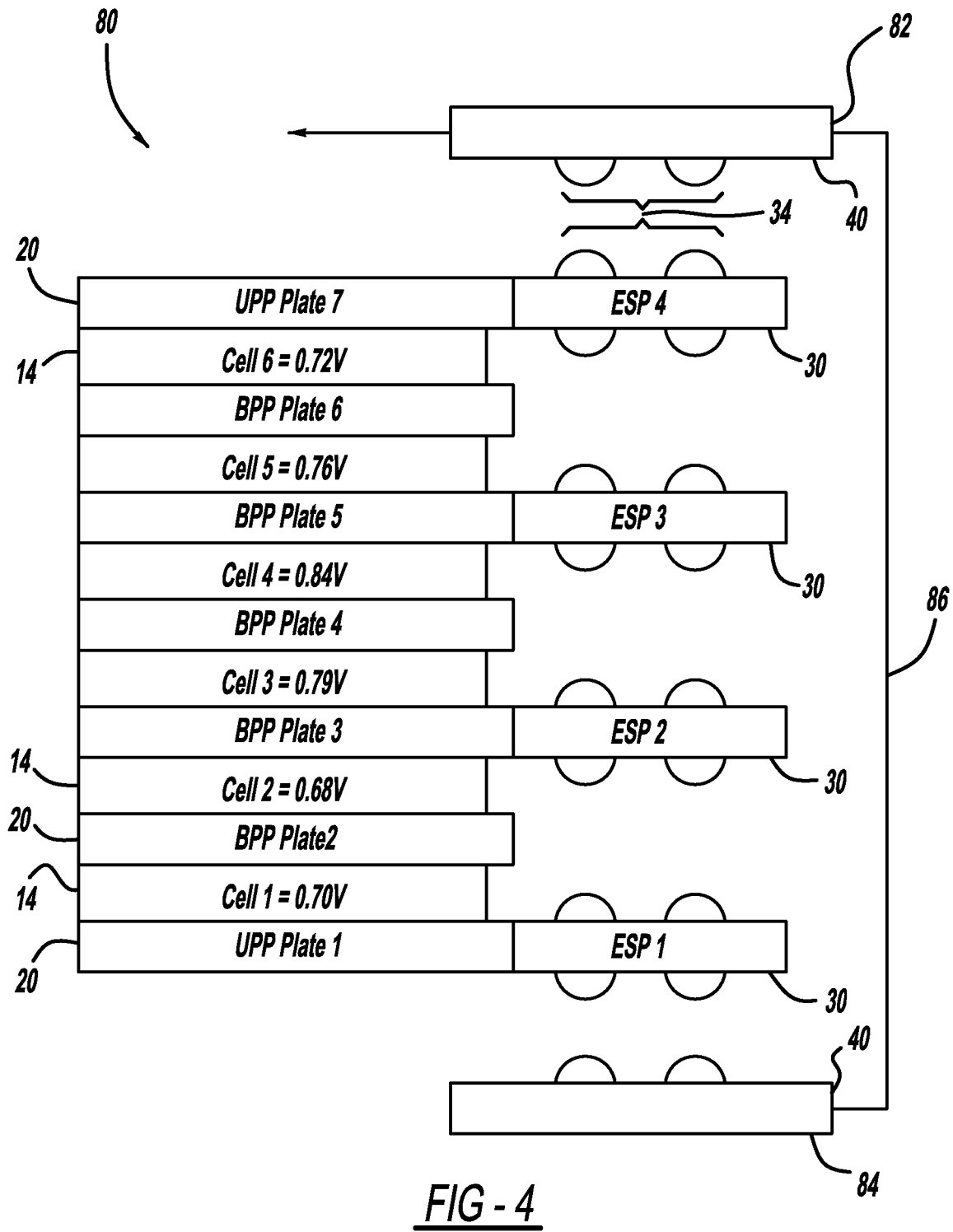
FIG. 4 is a plan view of a fuel cell system having a plurality of fuel cells, embedded smart plates and two aggregator devices for collecting location and measurement data for the smart plates in the stack.

FIG. 4 is a block diagram of a system 80 similar to the system 10, where like elements are identified by the same reference numbers. The system 80 includes two aggregator devices 40 that are fitted with complimentary optical transceivers 34 to match the optical transceivers 34 of the topmost and bottommost ESPs 30 that are exposed at the ends of the stack of the ESPs 30. The aggregator devices 40 are additionally fitted with a microprocessor 56, which is electrically coupled to the optical transceivers 34, and which may be electrically coupled to an external control system such as the control system 44. The microprocessors 56 of the aggregator devices 40 at each end of the stack of ESPs 30 are electrically coupled on a line 86 such that one aggregator acts as a communications "master" and the other acts as a communications "subordinate," as is discussed in detail below.

As discussed above, the aggregator devices 40 are placed at each end of the stack 12 such that communication of the measured values may be requested and coordinated. A request may come from radio frequency (RF) or radio frequency identification (RFID) type communications from an external device such as the control system 44. Additionally, capacitive coupling could be used to communicate digital data between adjacent ESPs 30, thus providing galvanic isolation by blocking DC voltage and passing AC voltage.

As discussed above, in the non-limiting embodiment of FIG. 4, the system 80 may be fitted with the aggregator devices 40 at the top and the bottom of the stack 12. One of the aggregator devices 40 acts as a "master" aggregator 82 and the other aggregator device 40 acts as a "subordinate" aggregator 84. The master aggregator 82 begins communication by issuing a command (in the form of a pulse-position modulation (PPM) packet) to the ESP 30 adjacent to the master aggregator 82 via the optical transmitter 34 on the bottom side of the master aggregator 82. The ESP 30 adjacent to the master aggregator 82 receives the communication via the optical receiver 34 located on the top side of the ESP 30. The ESP 30 adjacent to the master aggregator 82 then executes the command issued from the master aggregator 82, which might include capturing a measurement value or substituting measurement data into the PPM packet's data payload.

Following execution of the command from the master aggregator 82 by the adjacent ESP 30, the ESP 30 adjacent to the master aggregator 82, i.e., the first ESP 30, attempts to issue the command (possibly with modified payload) to the next ESP 30 in the columnar arrangement, i.e., the second ESP 30. Thus, the topmost ESP 30 executes the command issued from the master aggregator 82, which might include capturing a measurement value or substituting measurement data into the PPM packet's data payload. Following execution of the command, the topmost ESP 30 attempts to issue the command (possibly with modified payload) to the next ESP 30, moving longitudinally "away" from the ESP 30 along the stack of ESPs. This process of communication continues to each ESP 30 in the stack 12 until the cycle of command-issue, command-acknowledgment and command-execution is repeated by all the ESPs 30 in the stack 12.

The system 80 utilizes ESPs 30 on every other stack plate 20, therefore, each ESP 30 in the system 80 measures a group of two fuel cells 14 in the stack 12. For example, the master aggregator 82 communicates its voltage, and the first ESP 30 measures the total voltage and subtracts the voltage of the master aggregator 82 to determine the measured voltage value of the group of cells 14 associated with the first ESP 30. The first ESP 30 may then communicate the total value and its value, and the second ESP 30 may subtract the total value communicated by the first ESP 30 to determine the measured voltage value of the group of cells 14 associated with the second ESP 30. If a minimum voltage request was sent by the control system 44, the second ESP 30 will determine if the measured voltage of the second ESP 30 is less than the measured voltage of the first ESP 30. If so, the second ESP 30 communicates the total measured value including the measured value of the group of fuel cells 14 associated with the second ESP 30, and the value of the measured voltage of the group of cells 14 associated with the second ESP 30 as the minimum voltage value recorded thus far in the stack 12 to a third ESP 30 in the stack 12. Each ESP 30 repeats the process as described above with respect to the second ESP 30 until all the voltage values of the groups of the fuel cells 14 are known, and the group of fuel cells 14 with the minimum voltage has been identified.

After the bottom-most ESP 30 in the stack 12 executes the command, it issues the command (possibly with modified payload) to the subordinate aggregator 84. The subordinate aggregator 84 receives the command, and transmits a success message to the master aggregator 82 via the electrical coupling on the line 86.

While the above non-limiting embodiment utilizes the master aggregator 82 at the top of the stack 12 and the subordinate aggregator 84 at the bottom of the stack 12, the location of the master aggregator 82 and the subordinate aggregator 84 may be located interchangeably at either end of the stack 12.

According to the non-limiting embodiment described in FIG. 4 that includes the master aggregator 82 and the subordinate aggregator 84, a failed or inoperative ESP 30 that interrupts the flow of the command-issue, command-acknowledgment and command-execution cycle may be overcome. For example, if an ESP 30 has failed or is inoperative, that ESP 30 will not acknowledge the command that has been issued by the master aggregator 82 or the ESP 30 adjacent to the failed ESP 30, if applicable. If this occurs, and the command issuer is an ESP 30 in the stack 12, the ESP 30 issuing the command to the failed ESP 30 may reverse the direction of communication by issuing the command (or a modified command to indicate the failure) to the ESP 30 from which the command was originally received.

The reversal of the direction of communication of the ESPs 30 allows the command, or modified command, to be relayed back to the aggregator device 40 that originated the command, thereby allowing detection of the failure.

In the case that the master aggregator 82 originated the command, and a communication failure is detected, the master aggregator 82 may transmit a message using the line 86 to request that the subordinate aggregator 84 issue the command to the ESP 30 adjacent to the subordinate aggregator 84 at the opposite end of the stack 12, thereby allowing the stack 12 to be interrogated from both ends. In this way, the system 80 may prevent the loss of measurement data from a portion of the stack 12 due to a single failed or inoperative ESP 30.

In another non-limiting embodiment, an additional pair of optical transceivers 34 may be installed on the top and bottom surfaces of each ESP 30 in the stack 12. Each ESP 30 is also fitted with apertures in alternating geometric locations such that PPM packets may be directed "around" a failed or inoperative ESP 30. In this way, the loss of measurement data from a portion of the stack 12 due to the presence of two failed or inoperative ESPs 30 in the stack 12 may be prevented, provided that the failed or inoperative ESPs 30 are not immediately adjacent to each other in the stack 12.

In another non-limiting embodiment, the optical transmitters 36 and the optical receivers 38 of the optical transceivers 34 on each of the ESPs 30 may have different spectral emissions and responses, respectively, and may be employed for "upward-bound" and "downward-bound" PPM packets. In this way, the cross-talk between the optical transceivers 34 located on the ESPs 30 that are in close physical proximity to one another in the stack 12 may be minimized or eliminated.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A system for communicating measurement data from fuel cells in a fuel cell stack, said system comprising:
   a plurality of fuel cells that each create a voltage potential;
   a plurality of stack plates including one stack plate between each fuel cell and on each end of the fuel cell stack to collect the voltage potential generated by each of the fuel cells;
   a plurality of embedded smart plates, each embedded smart plate being mechanically and electrically coupled to at least one of the plurality of stack plates in the fuel cell stack, each embedded smart plate including optical transceivers on the top side and the bottom side of the embedded smart plate, each of the embedded smart plates receiving operating power from the fuel cell stack via the voltage potential from the fuel cell adjacent to the stack plate that the embedded smart plate is coupled to; and
   a first aggregator device located at one end of the plurality of embedded smart plates in the fuel cell stack, and a second aggregator device at the other end of the plurality of embedded smart plates in the stack, said first and second aggregator devices including at least one optical transceiver for communicating with the embedded smart plates, wherein the first aggregator device initiates communication with the embedded smart plates such that the embedded smart plates communicate in series through the stack until the second aggregator device completes communication after receiving the communication from the last embedded smart plate in the stack.

2. The system according to claim 1 further comprising an electrical coupling between the first and second aggregator device so as to enable direct communication between the first and second aggregator devices.

3. The system according to claim 2 wherein the first aggregator device utilizes the electrical coupling between the first and second aggregator device to initiate a communication from the second aggregator device to the embedded smart plates so as to prevent the loss of measurement data from a portion of the stack due to a single failed or inoperative embedded smart plate.

4. The system according to claim 1 wherein each of the optical transceivers on each of the embedded smart plates and on the first and second aggregator devices includes an optical transmitter and an optical receiver.

5. The system according to claim 4 wherein the optical transceiver(s) on each of the embedded smart plates and on the first and second aggregator devices are aligned with the optical receivers on adjacent embedded smart plates and/or the aggregator devices.

6. The system according to claim 1 wherein the location and the measurement values such as cell voltage, high frequency resistance and/or temperature is communicated by the embedded smart plates to the first or second aggregator device via the optical transceivers.

7. The system according to claim 1 wherein each embedded smart plate includes an embedded smart plate printed circuit board having a low-input voltage DC-to-DC converter, an analog-to-digital converter, a microprocessor and a voltage reference.

8. The system according to claim 1 wherein the first and second aggregator devices include a microprocessor and are electrically coupled to a battery.

9. The system according to claim 1 wherein the embedded smart plates are embedded in the fuel cell stack in a columnar arrangement.

10. A system for communicating measurement data from fuel cells in a fuel cell stack, said system comprising:
    a plurality of fuel cells;
    a plurality of stack plates including one stack plate between each fuel cell and on each end of the stack;
    a plurality of embedded smart plates, each embedded smart plate being mechanically and electrically coupled to at least one of the plurality of stack plates in the fuel cell stack, each embedded smart plate including optical transceivers on the top side and the bottom side of the embedded smart plate; and
    first and second aggregator devices, said first and second aggregator devices including at least one optical transceiver for communicating with the embedded smart plate adjacent to the first or second aggregator device, wherein one aggregator device initiates communication with the embedded smart plates and the other aggregator device completes communication.

11. The system according to claim 10 further comprising an electrical coupling between the first and second aggregator device so as to enable direct communication between the first and second aggregator devices.

12. The system according to claim 11 wherein the first aggregator device utilizes the electrical coupling between the first and second aggregator device to initiate a communication from the second aggregator device to the embedded smart plates so as to prevent the loss of measurement data from a portion of the stack due to a single failed or inoperative embedded smart plate.

13. The system according to claim 10 wherein each of the optical transceivers on each of the embedded smart plates and on the first and second aggregator devices includes an optical transmitter and an optical receiver.

14. The system according to claim 13 wherein the optical transceivers on each of the embedded smart plates and on the first and second aggregator devices are aligned with the optical receivers on adjacent embedded smart plates and/or the adjacent aggregator devices.

15. The system according to claim 10 wherein the location and the measurement values such as cell voltage, high frequency resistance and/or temperature is communicated by the embedded smart plates to the first or second aggregator device via the optical transceivers.

16. The system according to claim 10 wherein each embedded smart plate includes an embedded smart plate printed circuit board having a low-input voltage DC-to-DC converter, an analog-to-digital converter, a microprocessor and a voltage reference.

17. The system according to claim 10 wherein the first and second aggregator devices include a microprocessor and are electrically coupled to a battery.

18. A system for communicating measurement data from fuel cells in a fuel cell stack, said system comprising:
    a plurality of fuel cells;
    a plurality of stack plates, including one stack plate between each fuel cell and on each end of the stack;
    a plurality of embedded smart plates, each embedded smart plate being mechanically and electrically coupled to at least one of the plurality of stack plates, each embedded smart plate including an embedded smart plate printed circuit board and optical transceivers on the top side and the bottom side of each smart plate;
    a first aggregator device located at one end of the plurality of embedded smart plates in the stack, and a second aggregator device at the other end of the plurality of embedded smart plates in the stack, said embedded smart plates and first and second aggregator devices arranged in a columnar arrangement and said first and second aggregator devices including at least one optical transceiver for communicating with the embedded smart plate adjacent to the first or second aggregator device; and a controller configured to control the first aggregator device, wherein the controller requests that the first aggregator device communicate with the adjacent embedded smart plate such that the embedded smart plates communicate in series through the stack until the second aggregator device completes communication after receiving the communication from the last embedded smart plate in the stack.

19. The system according to claim 18 further comprising an electrical coupling between the first and second aggregator device so as to enable direct communication between the first and second aggregator device, wherein the first aggregator device utilizes the electrical coupling between the first and second aggregator device to initiate a communication from the second aggregator device to the embedded smart plates so as to prevent the loss of measurement data from a portion of the stack due to a single failed or inoperative embedded smart plate.

20. The system according to claim 18 wherein each of the optical transceivers on each of the embedded smart plates and on the first and second aggregator devices includes an optical transmitter and an optical receiver, and the optical transceivers on each of the embedded smart plates and on the first and second aggregator devices are aligned with the optical receivers on adjacent embedded smart plates and/or the adjacent aggregator devices.

* * * * *